Feb. 15, 1966 R. D. HEIN 3,235,244
ENERGY ABSORBING DEVICE FOR DOCK BUMPERS
Filed Sept. 13, 1963 4 Sheets-Sheet 1
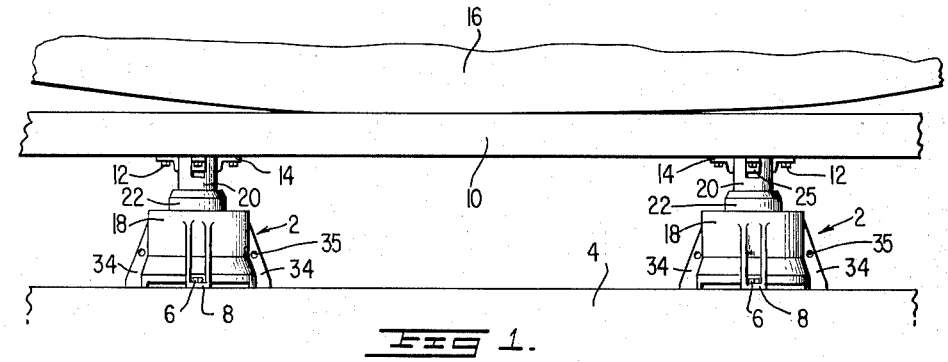
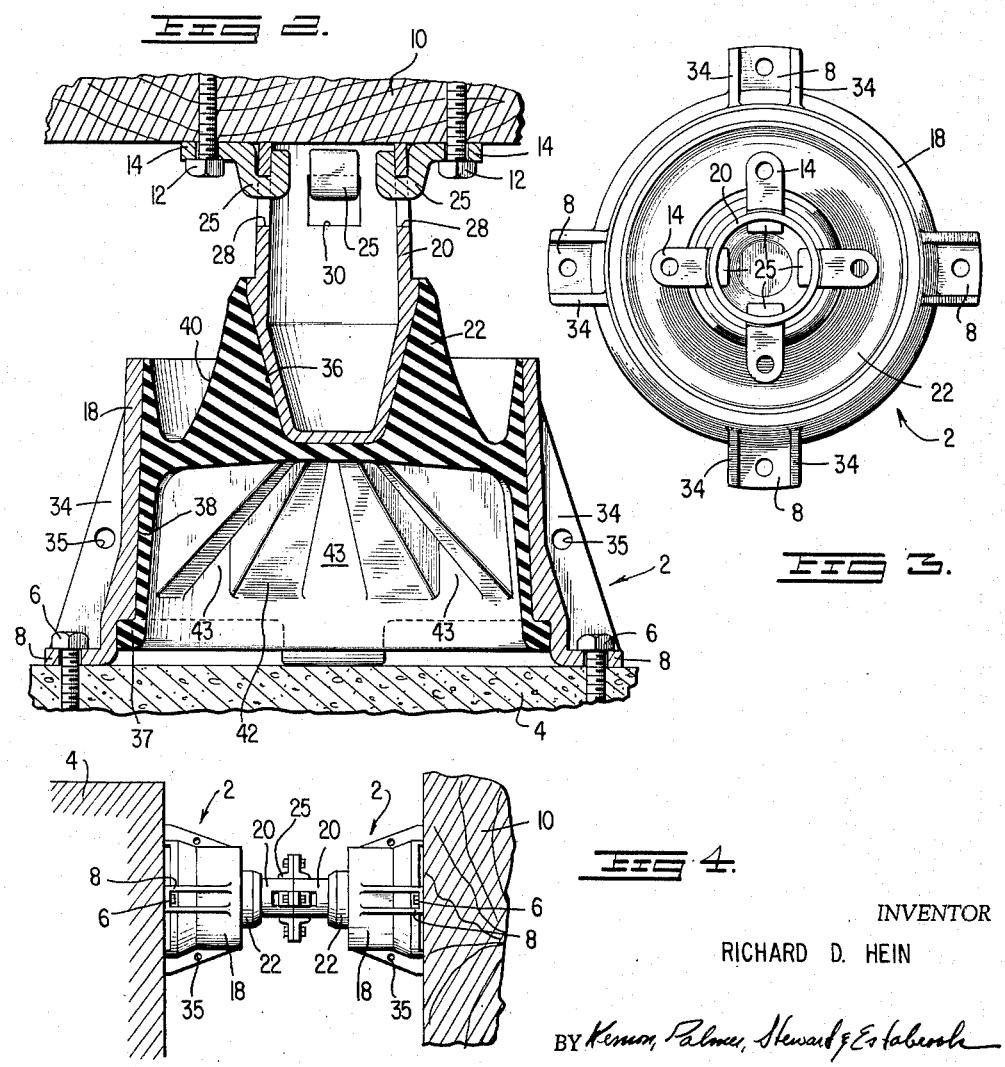
INVENTOR
RICHARD D. HEIN
BY *Kenson, Palmer, Stewart & Estabrook*
ATTORNEYS Feb. 15, 1966    R. D. HEIN    3,235,244
ENERGY ABSORBING DEVICE FOR DOCK BUMPERS
Filed Sept. 13, 1963    4 Sheets-Sheet 2
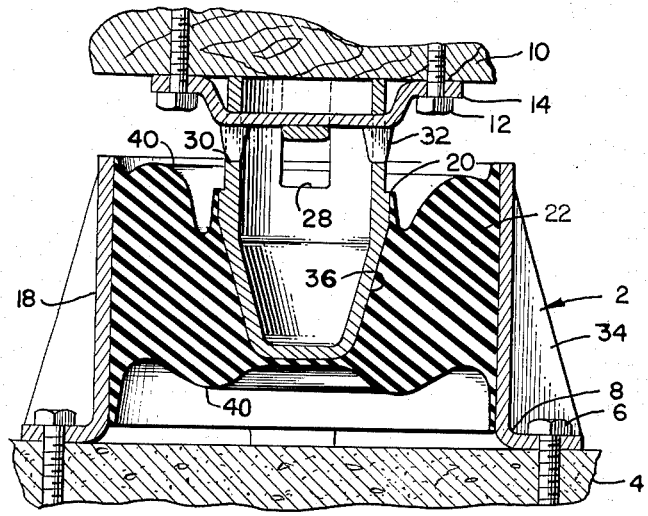
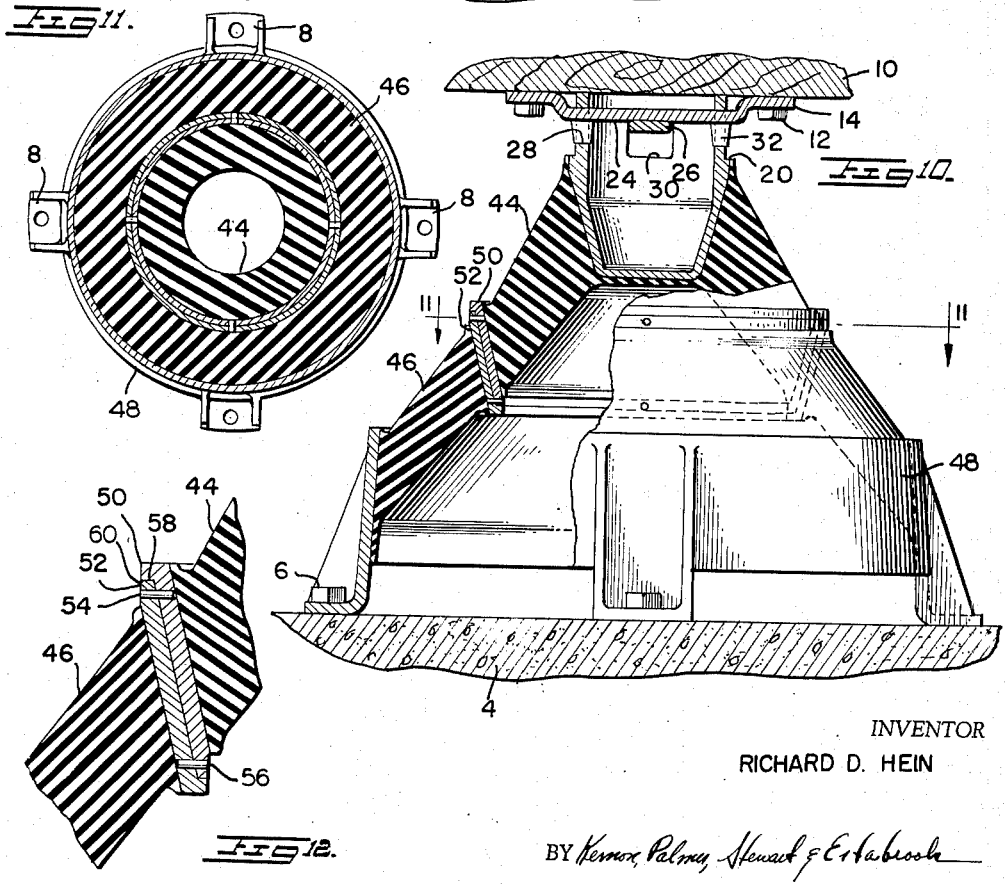
INVENTOR
RICHARD D. HEIN
BY *Kenyon, Palmer, Stewart & Estabrook*
ATTORNEYS

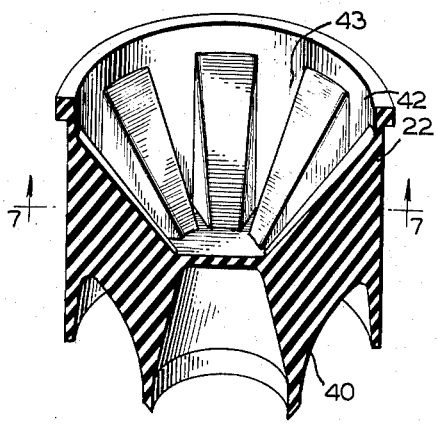
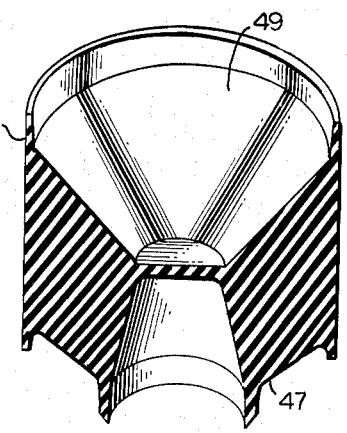
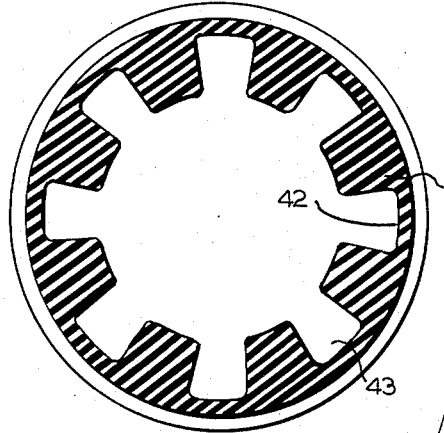
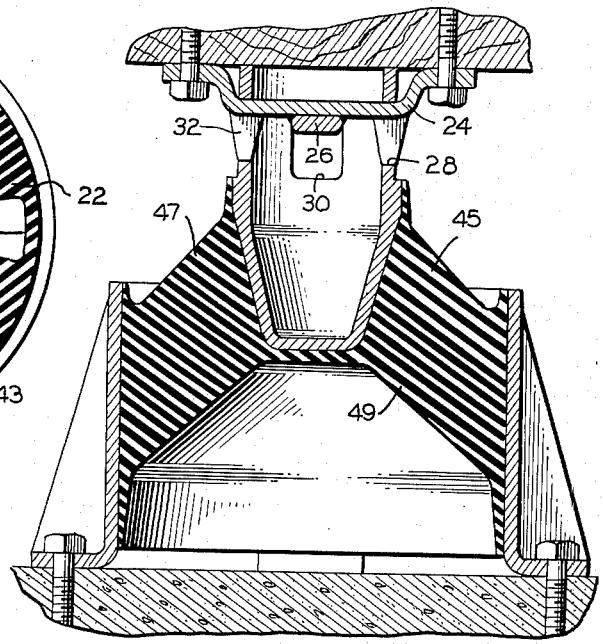

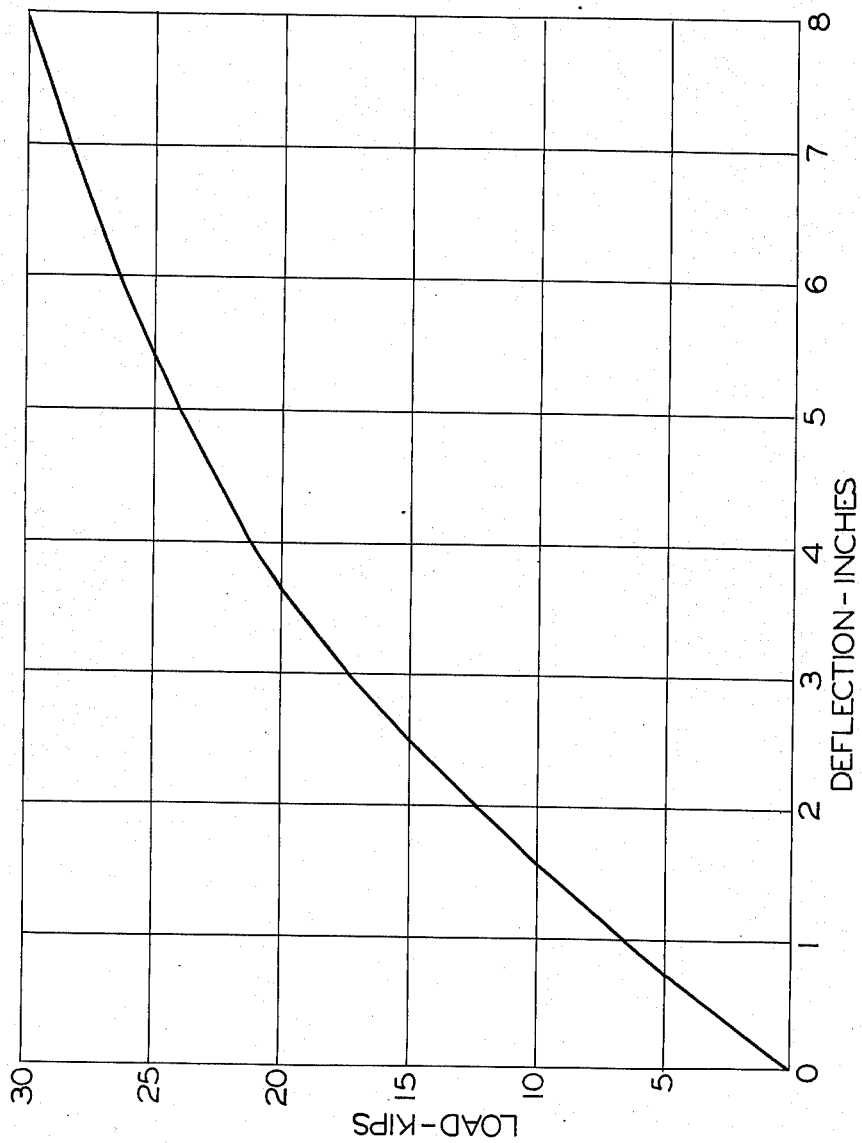

United States Patent Office 3,235,244
Patented Feb. 15, 1966

3,235,244
ENERGY ABSORBING DEVICE FOR DOCK BUMPERS
Richard D. Hein, Wabash, Ind., assignor to The General Tire & Rubber Company, a corporation of Ohio
Filed Sept. 13, 1963, Ser. No. 308,733
5 Claims. (Cl. 267—1)

This invention relates generally to dock bumpers and more specifically to a new and improved energy-absorbing device for use with ship and truck dock bumper structures.

The mooring and docking of ships, trucks, and like heavy vessels and vehicles, to wharfs, docks and other rigid structure presents special difficulties. Unless precautions are taken, damage can be incurred through the impact of large loads of the vehicle or vessel with rigid, immovable structures such as a reinforced concrete dock. In the past, it has been common to utilize resilient structure such as wooden docks, pilings and the like, or, with more rigid dock type structure, fenders such as rope mats, rubber tires and similar objects, to absorb the inertia attendant with the movement of large masses.

More recently, devices have been developed which utilize steel and rubber springs, hydraulic shock absorbers and other similar devices to absorb docking energy. This invention relates to a new and improved rubber spring type energy absorber which is designed to utilize, with the highest efficiency, elastomeric energy absorbing members in a manner which is especially adapted for and provides particular benefits when used in conjunction with dock bumpers and the like.

This invention specifically provides a new and improved device of the type disclosed in United States Patent No. 2,655,005 to Kinneman. The present invention, in a manner similar to one embodiment of Kinneman, discloses the uses of a circular or annular dock bumper element which utilizes coaxially disposed elements situated in a telescoped relationship with elastomeric members disposed therebetween. The Kinneman device, however, concerns the use of cylindrical annular elastomeric members formed so that the deformation of these members is primarily resisted by shear force. The present invention utilizes a structure which is specifically designed to utilize a combination of both the shear and compression resistance of the elastomeric member in a manner which more efficiently absorbs energy and presents, to the load, a resistance history especially adapted to efficiently fender the type of loading normally imposed in docking vesels and the like.

Another problem involved in structures of this type occurs when the structure is accidentally overloaded. If the vessel or vehicle being docked accidentally engages the bumper at a speed much in excess of the normal docking maneuver speed, the energy absorbing device, of course, cannot be expected to handle the enormous overloads which would result. This is especially true in large ships where energies on the order of hundreds of inch tons could result from the overloading. This invention, through the novel arrangement and design of its component parts, provides more than adequate energy absorbing capability for loadings in the normal ranges; however, the unique features of the device provide a maximum deflection limitation which limitation prevents excess stress on the elastomeric member to thereby avoid destruction thereof if unintentional overloading should occur.

It is object of this invention to provide a new and improved energy absorbing unit for dock bumpers.

It is further object of the invention to provide an elastomeric spring energy absorbing device for dock bumpers which, to a high degree of efficiency, utilizes the properties of the spring member thereof and thereby provides a maximum energy absorbing capability for a minimum size and weight of the structure.

It is another object of this invention to provide an elastomeric spring dock bumper which is simple, easily manufactured, relatively inexpensive in cost and maintenance, and highly durable in use.

It is still a further object of this invention to provide a new and improved elastomeric spring dock bumper which provides a varying resistance to deformation according to the most efficient program of absorbing energy imposed by docking vessels and the like and which provides energy factors in excess of .60.

It is another object of this invention to provide an energy absorbing elastomeric spring unit for dock bumpers which can be readily connected to a similar unit to provide the load capacity of the dock bumper as required.

It is still another object of this invention to provide an elastomeric spring dock bumper structure which affords protection for the elastomeric unit thereof in the event of unintentional overloading of the system.

These objects and other attendant advantages will be better understood to those skilled in the art by reference to the following detailed description when viewed in the light of the accompanying drawings wherein like numbers indicate like parts thereof and wherein:

FIG. 1 is a plan view of a dock bumper incorporating energy absorbing devices in accordance with the invention;

FIG. 2 is an enlarged sectional view of an energy absorbing device in accordance with the invention;

FIG. 3 is a plan view of the device of FIG. 2 slightly reduced in size;

FIG. 4 is a reduced side view showing an alternate arrangement of the device of FIG. 2;

FIG. 5 is a view of an embodiment of the invention in a partly compressed condition;

FIG. 6, is an inverted perspective view, in section, of the elastomeric member of the device for FIG. 2;

FIG. 7 is an enlarged sectional view of the elastomeric member of FIG. 6 taken along the line 7—7 thereof;

FIG. 8 is an inverted perspective view, in section, of an alternate elastomeric member embodying the invention;

FIG. 9 is a side elevation view in section of a device embodying the elastomeric member of FIG. 8;

FIG. 10 is a side elevation view in section of another device embodying the features of the invention;

FIG. 11 is a sectional view of the device of FIG. 10 taken along the lines 11—11;

FIG. 12 is an enlarged sectional view of a portion of the device of FIG. 10 partly broken away;

FIG. 13 is a load-deflection curve of the device of FIG. 2.

The objects of the invention are achieved, briefly, by providing an energy absorbing device which comprises a cylindrical tubular base mount and a coaxially disposed and telescoping frusto conical cup mount connected respectively to relatively movable portions of a dock structure. An elastomeric member is bonded to the mounts between the inner cylindrical surface of the base mount and the frusto conical surface of the cup mount. This arrangements provides an initial combination of compressive and shear loading of the elastomeric member as the cup mount is telescoped into the base mount. This type of loading yields a high rate of increase of resistance per unit deflection during the initial portion of the stroke. At approximately 50 percent of the stroke, due to the geometry of the opposed cylindrical and frusto conical surfaces of the mounts, the compressive loading increase terminates and a decrease in compressive loading is initiated. Shear loading, however, continues to increase since the relative longitudinal positions of the mounts continues to change as the unit is deflected. The resistance of the remainder of the stroke is due, primarily, to shear and, although the resistance increases at a lower rate than the initial resistance, the added resistance provides a longer stroke than would be available if the member were primarily or purely in compression and a higher average rate of resistance than if the member were primarily or purely in shear.

Referring now to FIG. 1 for a more complete understanding of the invention, a dock bumper device incorporating energy absorbing units of this invention, shown generally at 2, is mounted on dock 4. Bolts 6 or any other suitable attaching means are disposed through lugs 8 of the units to provide connection to the dock. Whaling strip 10 is connected to the ends of energy absorbing devices 2 by bolts 12. The whaling strip serves to distribute loadings from ship 16 to the respective energy absorbing devices as the ship approaches dock 4.

Referring more particularly to FIG. 2, energy absorbing device 2 is shown in detail and comprises cylindrical base mount 18, frusto conical cup mount 20 disposed coaxially with the base mount, and essentially conical shaped elastomeric member 22 disposed between and attached to the mounts. Bonding of the members may be accomplished by any suitable process known in the art. Clamps 25 are disposed through apertures 28 and 30 in cup mount 20 and form lugs 14 at their outer ends. The clamps serve as a convenient means to connect the cup mount to whaling strip 10. Of course, other structure may be provided to afford connection of the cup mount portion of the device to dock structure without varying the nature of the invention. As an example, referring to FIG. 10, upper and lower cross members 24 and 26 respectively, connected together at their centers by welding or like means, are disposed through apertures 28 and 30 in cup mount 20 and form lugs 14 at their outer ends. Depending T members 32 are formed on the bottom of cross member 24 in line with apertures 28 to provide support for the cross member system. The lug and opening configuration shown is designed primarily to afford assembly of the cross members in cup mount 20. In both of the above referred to embodiments the apertures also furnish draining means in the interior of the cup member to avert collection of water, moisture and the like.

Referring to FIG. 2, base mount 18 is provided with longitudinally disposed strengthening ribs 34 on either side of lug 8 to furnish additional buttressing of the walls of base member 18 as shown. Port 35 is provided in each of the ribs to facilitate the handling of the device with a crane hook. Transverse flange 37 is formed on the lower inner surface of the base mount. The configuration affords a maximum bonding surface between the base mount and the elastomeric member.

Cup mount 20 is provided with frusto conical outer surface 36 which is in opposed relationship to cylindrical inner surface 30 of base mount 18. With elastomeric member 22 in its relaxed condition, surface 36 is disposed with approximately one half of its longitudinal length within the upper end of base mount 18 as shown. In the embodiment shown in FIG. 2, the curved portion of the upper surface 40 of elastomeric member describes an arc with an 8 inch radius swung from a point 1 inch above the top of the unit and 11½ inches from the centerline thereof in a device having an overall length of 20 inches and an 8 inch stroke. The lower surface 42 defines an angle of 40 degrees with the horizontal. In this embodiment wedge shaped recesses 43 are provided in the lower surface of member 22 for purposes to be described below.

With the configuration described above, axial loads placed on the device through whaling strip 10 cause deformation of elastomeric member 22 and telescoping of cup mount 20 into base mount 18 as shown in an intermediate stage for another embodiment in FIG. 5. Due to the geometry of the parts, the initial portion of the deflection of the member produces a rapid load increase due, primarily, to compression forces being imposed on the elastomeric member during this initial deflection. When the unit has been deflected approximately 50 percent, or geometrically, when the top edge of frusto conical surface 36 is at the upper edge of base mount 18, a maximum compressive load on the elastomeric member is reached. At that point, further radial compression of the elastomeric member due to the coaction between frusto conical surface 36 and cylindrical surface 38 terminates and increasing compressive loading in the member is terminated as deflection continues. At and beyond the point of maximum compression, shear forces, caused by the relative longitudinal motion between the mounts, continue to build up and provide resistance to deflection until whaling strip 10 bottoms against the base mount 18.

For an embodiment of the invention having the configuration of FIG. 2 and having as general dimensions, a 20 inch height by 16 inch major diameter with an 8 inch stroke, an actual load deflection curve is shown in FIG. 13 of the drawings. In this embodiment for example, the major diameter and length of the cup mount 20 are approximately equal to one-half the inner diameter of the base mount 18, the angle of the frusto-conical portion 36 of the cup mount 20 is approximately 15° from the central axis of the base mount and the mean thickness of the elastomeric member 22 is equal to 30 percent of the major diameter thereof. The above dimensions are set forth as illustrative of the specific configuration of a preferred embodiment of the invention but it should be understood that the dimensions and ratios may be varied within the overall general configuration shown according to the requirements of the particular installation.

Referring specifically to the curve of FIG. 13, it will be noted that a rapid, essentially proportional increase in resistance to deflection occurs during the initial portion of the deflection over that which would result solely from shear. This total resistance is due to a combination of resistance to compression and resistance to shear but the increase is due to the compressive resistance in the elastomeric spring member. After the deflection of the unit passes the point of maximum compression in the member, as described above, the rate of increase of loading, or as it is more often called, loading rate, diminishes. As deflection continues, although compressive resistance is diminishing, the resistance to deflection due to shear loading increases sufficiently to contribute to continuing increase in the load and a decrease of loading rate because under such conditions the Young's modulus approaches infinity so that further deflection could only be caused by the application of an infinitely large stress.

The efficiency of an elastomeric energy absorbing device is indicated by a term known in the art as the energy factor. The energy factor is defined by the equation:

$$\text{Energy factor} = \frac{\text{energy absorbed}}{\text{maximum terminal load} \times \text{maximum deflection}}$$

Geometrically, referring to FIG. 13 of the drawings, the energy absorbed is equal to the area under the load-deflection curve while the subtrahend of the right hand side of the equality is equal to the total area available. The total area available would be the energy absorbing capability of a theoretically ideal elastomer which provide full and constant load resistance from the time deflection is initiated until full deflection occurs. The right hand side of the equality is, therefore, the ratio of the total energy absorbing capability of a theoretically ideal member to the amount of energy actually absorbed. As an example, a straight-line curve, diagonally drawn from the lower left hand corner to the upper right hand corner of the graph of FIG. 13, would represent an energy factor of .50 since the area beneath the curve would be equal to one-half of the total rectangular area available.

Compressive loading of an elastomeric member produces a higher energy factor than shear loading of the same member since compressive loading is a function of Young's modulus (E) while shear loading is a function of the modulus of rigidity (G) of the material. The relationship between Young's modulus and the modulus of rigidity can be described by the equation:

$$E = 2G(1+\mu)$$

where "$\mu$" is equal to Poisson's ratio for that material. For a typical Poisson's ratio equal to .5 for the elastomeric member, Young's modulus would be equal to 3 times the modulus of rigidity of the material. Although compressive loading of a member produces a higher initial loading rate, the total deflection available is less than that which would be available if the member were loaded in shear since the material quickly reaches its maximum compressed dimension. At that point little further deflection occurs. This can be adequately demonstrated by reference to U.S. Patent 2,858,127 to Moulton and specifically to the curve shown in FIG. 9 thereof. This device provides a rubber spring which is ultimately loaded in pure compression and the right hand substantially vertical portion of the curve shown in FIG. 9 thereof is typical of the history of a compressively loaded elastomeric member. Loading an elastomeric in compression alone, therefore, although producing a high initial loading rate, is inefficient since the limited deflection available limits the total amount of energy which can be absorbed by the member. Loading the member in shear alone, although producing a large deflection, results in a lower over-all loading rate since the resistance of the elastomer in shear is lower than the resistance in compression. "Energy factors in excess of .50 are realized (FIGURE 13 of the drawings), by providing an energy-absorbing device which initially utilizes the compressive resistance of the elastomer to a predetermined optimum and thereafter absorbs additional energy by shear loading." For the particular configuration discussed above and as shown graphically in FIG. 13 of the drawings, an energy factor equal to .62 is achieved.

This device, therefore, provides a combination of the benefits available both through shear deflection and compressive deflection in such a manner that an initial high resistance per unit deflection is provided for the initial portion of the stroke while the longer terminal portion of the stroke is resisted by the lower increasing rate of the resistance per unit deflection due to shear loading.

The invention also provides maximum utilization of all of the properties of the elastomeric member, both the resistance to shear and the resistance to compression in such a manner as to provide maximum absorption of energy with minimum weight and size. The unit, at the same time, provides compressive resistance during the initial portion of deflection yet is so designed that compressive resistance is terminated at a mid-portion of the stroke. This provides the added benefit of avoiding destruction of the elastomeric member under compressive overloading.

In FIGS. 6 and 7, the configuration of recesses 43 in the lower surface of the device of FIG. 2 are shown. As the elastomer is deformed to a point shown in FIG. 5, recesses 43 are compressed inwardly. The purpose of the generally frusto-conical section with indentations or recesses therein is intended to result in a structure which has an approximately constant shear area regardless of load. The importance of the shear area remaining constant is that any given portion of the elastomer is subjected to the same amount of shear working as all other portions. By shear area it is meant that surface generated by rotating a line parallel with the center line of the section around the center, e.g., any cylinder concentric with center line of the elastomeric member. In order to provide a constant shear area, it is necessary that the elastomeric member be configured in such a manner that the included areas disposed in concentric cylinders through intermediate portions of the elastomeric member are substantially constant. An additional advantage of the recessed design is that it provides a lateral stability which is necessary because, in addition to forces normal to the device, a docked ship will also assert a lateral force. The normal force is, of course, provided for as heretofore discussed but the lateral force must be compensated for or the beam or whaling strip would move laterally and this in turn would move the cup laterally. The lateral stability is a function of the non-recessed portions of the elastomeric member acting as strengthening ribs.

The elastomeric member of the device, although shown as a frusto-conical figure revolution having essentially curved top and recessed bottom sides thereto, can incorporate upper and lower surfaces of other configurations if desired. For example, referring to FIG. 9, an elastomeric member 45 having an essentially straight frusto-conical upper surface 47 and lower surface 49 would present a similar resistance history to the telescoping mounts attached thereto and an energy factor similarly in excess of .50.

Referring now to FIG. 4 of the drawings, a pair of units 2 are shown arranged in an alternate configuration. The base mounts of the two members are connected to dock 4 and whaling strip 10 respectively while lugs 14 thereof are disposed in abutting relationship and connected together by bolts 12. This alternate disposition of the units can be utilized where increased deflection and energy absorption capabilities are required. The units function in the same manner as that described for the configuration as shown in FIG. 2.

FIG. 10 is an alternative device embodying the invention. Where, as in the situation of the configuration of FIG. 4, additional energy absorbing capability is required beyond the capability of the configuration of FIG. 2, the elastomeric member may be enlarged to provide the additional required capability. In FIG. 10, this is achieved by providing two or more concentrically disposed frusto-conical elastomeric members, upper member 44 and lower member 46 respectively between cup mount and base mount 48. Base mount 48 tapers slightly in an upward direction. This taper merely provides sufficient draft for the molding of the member and may or may not be present in any of the base members as is determined by the method of fabrication. Cup mount 20, similar to the corresponding device shown in FIG. 2, is mounted, in the manner above, to whaling strip 10 while base mount 48 is mounted to the dock structure by bolts 6. Elastomeric members 44 and 46 are bonded to intermediate facing cones 50 and 52 respectively and to cup mount 20 and base mount 48 respectively as described above. Similarly it is possible to use these four or more units to obtain any desired capability.

Referring to the enlarged view of the juncture of the elastomeric members in FIG. 12, members 50 and 52 are tapered in a manner to mate with one another as shown and are provided with retaining pins 54 and 56 disposed through bores at the upper and lower ends thereof and around the periphery of the cones to connect the cones together fastening means may, of course, be submitted. Shoulders 58 and 60 are disposed around the outer periphery of the upper portion of cones 50 and the inner periphery of the lower portion of cone 52 respectively. This disposition of the shoulders avoids wedging deformation of the cones under compressive loadings imposed on the unit.

The major rigid portions of the device should be formed from cast steel or from a material having similar structural properties, e.g. fiber glass and plastics. The elastomeric member may be of rubber or the like, preferably a material having a Duro-hardness in the neighborhood of 60. The entire unit, especially when intended for uses involving exposure to petroleum, sea water, or other corrosive environments, may be coated with a protective coating layer, such as neoprene. Other coatings such as a galvanized coat or plating may also be used. Utilization of elastomeric materials such as synthetic rubbers which are resistant to attack by petroleums or the like may be incorporated without varying the practice of the invention.

Obviously many other modifications to the invention may be made in the light of the above teachings and what is set forth therein is intended merely as exemplary to enable those skilled in the art to practice the invention.

What is claimed as new and desired to be protected by Letters Patent of the United States is:

1. An energy absorbing device for dock bumpers comprising:

a cylindrical base mount having upper and lower ends thereto, a cup mount coaxially disposed in the upper end of said base mount, said cup mount having a frusto-conical portion thereto, the major diameter and the length of the frusto-conical portion of said cup mount being approximately equal to one-half of the inner diameter of said base mount, the frusto-conical portion of said cup mount tapering downwardly and inwardly away from the inner surfaces of said base mount at an angle of approximately 15° from the axis thereof, said frusto-conical portion extending approximately one-half the length thereof into the upper end of said base mount;

an essentially frusto-conical annular elastomeric member connected between the opposed surfaces of said mounts, said member being substantially equal in longitudinal thickness to 30 percent of the major diameter thereof;

said member providing a shear resistance to telescoping motion of said mounts for approximately the first half of the telescoping stroke thereof and providing decreasing compressive and continued increasing shear resistance to the telescoping motion for the remainder of the stroke thereof.

2. An energy absorbing device for mounting between relatively movable structures comprising:

a cylindrical base mount having upper and lower ends thereto, means to connect the lower end of said mount to one of said structures;

a cup mount having a frusto-conical portion thereto coaxially and telescopably disposed in the upper end of said base mount, said cup mount being normally axially displaced from said base mount, the frusto-conical portion of said cup mount tapering downwardly and away from the interior surface of said base mount at an acute angle with respect to the axis thereof, means to connect the larger end of said cup to the other of said structures;

an annular elastomeric member having upper and lower essentially frusto-conical surfaces thereto, said member being connected between the radially opposed surfaces of said mounts, the lower surface of said member having a plurality of radially arranged and axially extending wedge-shaped recesses formed therein defining radially disposed wedge-shaped ribs between each of said recesses, the configuration of said lower surface being such that the included areas disposed in concentric cylinders through the intermediate portions of the elastomeric member are substantially constant;

said member providing increased compressive and shear resistance to telescoping motion of said mounts for approximately the first half of the telescoping stroke thereof and providing decreasing compressive and continued increasing shear resistance to the telescoping motion for the remainder of the stroke thereof, said ribs further providing optimum stress loading per unit volume of said elastomeric unit.

3. An energy absorbing device for mounting between relatively movable structures comprising:

a tubular base mount having upper and lower ends thereto, means to connect the lower end of said mount to one of said structures;

a cup mount having a frusto-conical portion thereto coaxially and telescopably disposed in the upper end of said base mount, said cup mount being normally axially displaced from said base mount, the frusto-conical portion of said cup mount tapering downwardly and away from the interior surface of said base mount at an acute angle with respect to the axis thereof, means to connect the larger end of said cup to the other of said structures;

said device being configured so that the other of said structures bottoms against said base mount when said device is fully telescoped;

an annular elastomeric member having upper and lower essentially frusto-conical surfaces thereto, said member being connected between the radially opposed surfaces of said mounts, the lower surface of said member having a plurality of radially arranged and axially extending wedge-shaped recesses formed therein defining radially disposed wedge-shaped ribs between each of said recesses, the configuration of said lower surface being such that the included areas disposed in concentric cylinders through intermediate portions of the elastomeric member are substantially constant;

said member providing increased compressive and shear resistance to telescoping motion of said mounts for approximately the first half of the telescoping stroke thereof and providing decreasing compressive and continued increasing shear resistance to the telescoping motion for the remainder of the stroke thereof, said ribs further providing optimum stress loading per unit volume of said elastomeric unit.

4. An energy absorbing device for mounting between relatively movable structures comprising:

a cylindrical base mount having upper and lower ends thereto, means to connect the lower end of said mount to one of said structures;

a cup mount having a frusto-conical portion thereto coaxially and telescopably disposed in the upper end of said base mount, said cup mount being normally axially displaced from said base mount, the frusto-conical portion of said cup mount tapering downwardly and away from the interior surface of said base mount at an acute angle with respect to the axis thereof, means to connect the larger end of said cup to the other of said structures;

said cup mount being shorter in axial length than said base mount so that the other of said structures bottoms against said base mount when said device is fully telescoped;

an annular elastomeric member having upper and lower essentially frusto-conical surfaces thereto, said member being connected between the radially opposed surfaces of said mounts, the lower surface of said member having a plurality of radially arranged and axially extending wedge-shaped recesses formed therein defining radially disposed wedge-shaped ribs between each of said recesses, the configuration of said lower surface being such that the included areas disposed in concentric cylinders through intermediate portions of the elastomeric member are substantially constant;

said member providing increased compressive and shear resistance to telescoping motion of said mounts for approximately the first half of the telescoping stroke thereof and providing decreasing compressive and continued increasing shear resistance to the telescoping motion for the remainder of the stroke thereof, said ribs further providing optimum stress loading per unit volume of said elastomeric unit.

5. In an energy absorbing device for mounting between relatively movable structures, an energy absorbing member comprising an essentially frusto-conical annular elastomeric member having upper and lower surfaces thereto, the longitudinal dimension of said member defining inner and outer walls, one of the walls of said member being disposed substantially parallel to the longitudinal axis thereof, the other of said walls being disposed at an angle to said axis tapering downwardly and inwardly with respect thereto, the lower surface of said member having a plurality of radially arranged and axially extending wedge-shaped recesses formed therein, the wedge-shaped recesses defining radially disposed wedge-shaped ribs between each of said recesses, the configuration of said lower surface being such that the included areas disposed in concentric cylinders through intermediate portions of the elastomeric member are substantially constant, said member providing increased compressive and shear resistance between the inner and outer walls thereof for approximately the first half of a telescoping movement therebetween and providing decreasing compressive and continued shear resistance to the telescoping motion for the remainder of the movement therebetween, said ribs further providing optimum stress loading per unit volume of said elastomeric member.

References Cited by the Examiner
UNITED STATES PATENTS 2,656,005 10/1953 Kinneman.
2,858,127 10/1958 Moulton.

FOREIGN PATENTS 862,798 3/1961 Great Britain.
1,219,563 12/1959 France.

OTHER REFERENCES

Fahrenkrug, German Application 1,110,475, printed July 6, 1961 (Kl 47a 17).

ARTHUR L. LA POINT, *Primary Examiner.*